United States Patent [19]
Haynes et al.

[11] Patent Number: 5,913,944
[45] Date of Patent: Jun. 22, 1999

[54] CABLE ASSEMBLY WITH TELESCOPING CORE TERMINAL

[75] Inventors: Robert Haynes, Perkasie; Ronnie Benditt, Horsham, both of Pa.

[73] Assignee: Triumph Controls, Inc., North Wales, Pa.

[21] Appl. No.: 08/909,314

[22] Filed: Aug. 14, 1997

[51] Int. Cl.⁶ .................................................... F16C 1/10
[52] U.S. Cl. ........................................ 74/502.6; 74/500.5
[58] Field of Search ............................ 74/500.5, 501.5 R, 74/501.6, 502, 502.4, 502.6, 502.3

[56] References Cited

U.S. PATENT DOCUMENTS

| | | |
|---|---|---|
| 3,206,998 | 9/1965 | Matz, Jr. et al. . |
| 3,273,417 | 9/1966 | Sevrence . |
| 3,645,150 | 2/1972 | Crossland . |
| 4,223,564 | 9/1980 | Fawcett . |
| 4,406,177 | 9/1983 | Bennett et al. ........................ 74/500.5 |
| 4,584,898 | 4/1986 | Panushka . |
| 4,630,957 | 12/1986 | Ausprung . |
| 4,753,123 | 6/1988 | Stormont . |
| 4,799,400 | 1/1989 | Pickell . |
| 4,917,224 | 4/1990 | Gokee . |
| 5,058,462 | 10/1991 | Killiany et al. . |
| 5,613,405 | 3/1997 | Kelley et al. . |

FOREIGN PATENT DOCUMENTS

| | | | |
|---|---|---|---|
| 719747 | 2/1932 | France ................................. | 74/502.4 |
| 65312 | 4/1983 | Japan .................................... | 74/502.5 |

*Primary Examiner*—John A. Jeffery
*Assistant Examiner*—Mary Ann Battista
*Attorney, Agent, or Firm*—Howard & Howard

[57] ABSTRACT

The remote control assembly 10 is characterized by a terminal mechanism 34 including a tubular anchor member 36 slidably supported on a tubular fitting 22 extending from the conduit 14. The anchor member 36 is secured to the outer end 30 of a rod 26 extending form the core element 12 and is disposed in close sliding relationship about the tubular fitting 22. The terminal mechanism 34 also includes a tubular connector member 44 and a coil spring 46. The connector member 44 is in telescoping relationship with the anchor member 36 and the spring 46 biases the connector member 44 in an extending direction and provides lost motion between the rod 26 and the control member in response to a predetermined collapsing force. A resilient cushion 48 is disposed in the connector member 44 for cushioning collapsing movement of the connector member 44 over the anchor member 36. There is also disclosed a method of fabricating the terminal mechanism comprising the steps of sliding a rod end 38 of the tubular anchor member 36 into an open end of the tubular connector member 44, establishing an abutment coacting between the connector member 44 and the anchor member 36 for limiting movement of the connector member 44 to a fully extended position in relationship to the anchor member 36, placing a coil spring 46 about the anchor member 36 and the connector member 44 to bias the connector member 44 to the fully extended position from the anchor member 36, sliding the anchor member 36 over the tubular fitting 22 extending from the conduit 14, and connecting the rod end 38 of the anchor member 36 to the outer end 30 of the rod 26.

9 Claims, 2 Drawing Sheets

CABLE ASSEMBLY WITH TELESCOPING CORE TERMINAL

BACKGROUND OF THE INVENTION

1. Field of the Invention

The subject invention relates to a motion transmitting remote control assembly of the type including a flexible motion transmitting core element movably supported in a conduit for transmitting motion in a curved path.

2. Description of the Prior Art

Remote control assemblies of this type are well know in the art to move a control member, such as a valve, from a conveniently located position which is remotely located from the actual control member being operated. A known function in such control assemblies is the ability to compensate for overtravel in the event the control member movement bottoms out before the core element movement. For example, if the control member being moved by the core element may reaches the closed position and a sufficient force is applied to the core element, the system could be damaged. In order to prevent such damage, an overtravel protection is built into the assembly to allow the core element to collapse when subjected to a predetermined high force. Examples of such assemblies are disclosed in U.S. Pat. Nos. 4,584,898 to Panushka; 4,630,957 to Ausprung; 4,753,123 to Stormont; 4,799,400, to Pickell; 4,917,224 to Gokee; 5,058,462 to Killiany et al. and 5,613,405 to Kelley et al.

In the design of such assemblies, it is an objective to minimize the length required by such overtravel mechanisms as well as to minimize the complexity of assembly.

SUMMARY OF THE INVENTION AND ADVANTAGES

A motion transmitting remote control assembly comprising a motion transmitting core element supported for longitudinal movement in a conduit. A tubular fitting extends from one end of said conduit and a rod is slidably disposed in the tubular fitting and has an inner end attached to the core element and an outer end extending form the tubular fitting. A terminal mechanism is attached to the outer end of the rod for transmitting motion between the rod and a control member and for providing lost motion between the rod and the control member in response to a predetermined force acting between the rod and the control member. The assembly is characterized by the terminal mechanism including an anchor member slidably supported on the tubular fitting.

The invention also includes the method of fabricating the terminal mechanism comprising the steps of: sliding the rod end of a tubular anchor member into an open end of the tubular connector member, establishing an abutment coacting between the connector member and the anchor member for limiting movement of the connector member to a fully extended position in relationship to the anchor member, biasing the connector member to the fully extended position from the anchor member with a predetermined force, sliding the anchor member over the tubular fitting extending from the conduit, and connecting the rod end of the anchor member to the outer end of the rod.

In accordance with the subject invention, therefore, there is provided a remote control assembly having overtravel protection in a minimum of longitudinal space by overlapping the rigid tube extending from the conduit and an assembly which is relatively easy to assemble.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
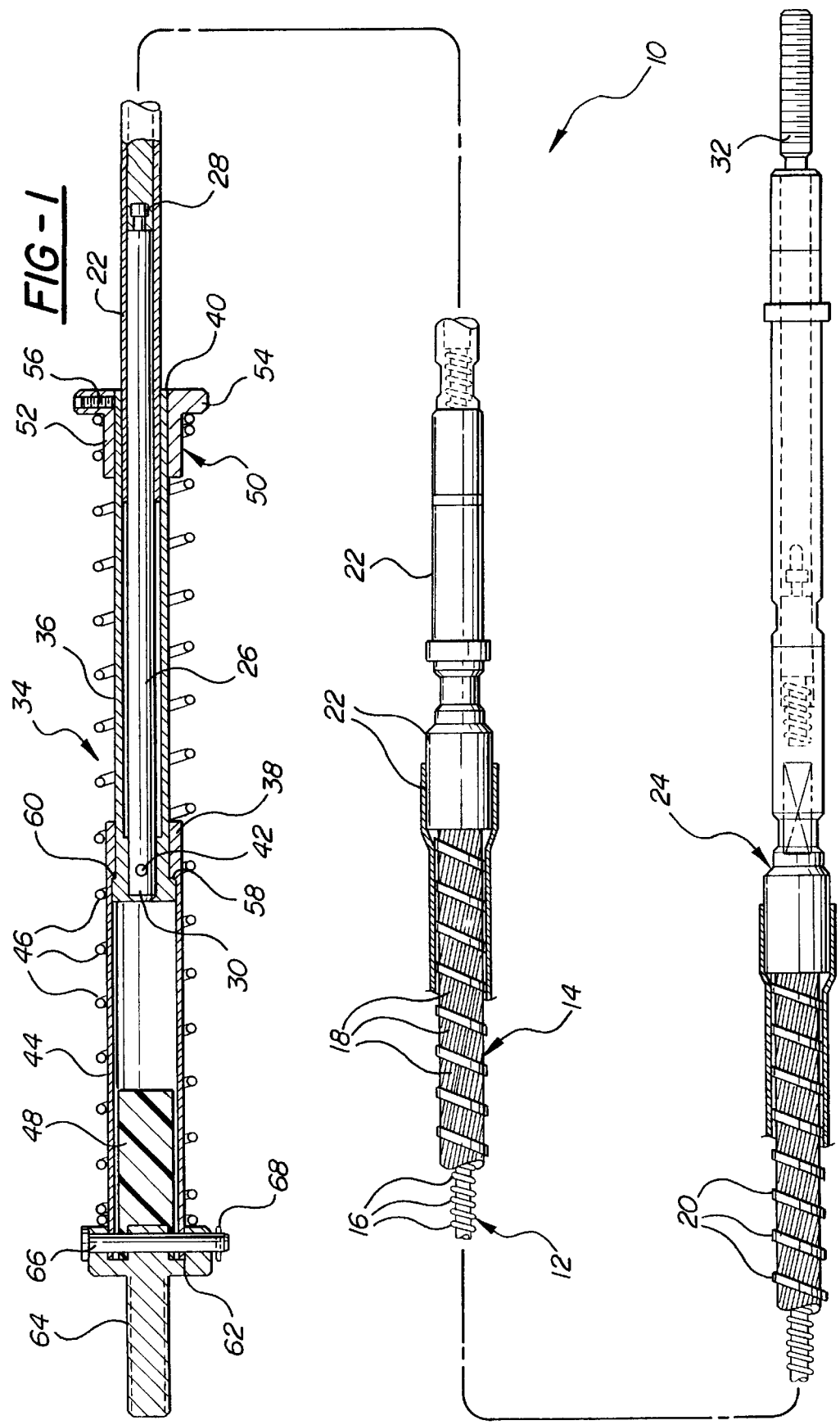
FIG. 1 is a side elevational view, partially broken away and in cross section in the normal operating position.
Figure 2:
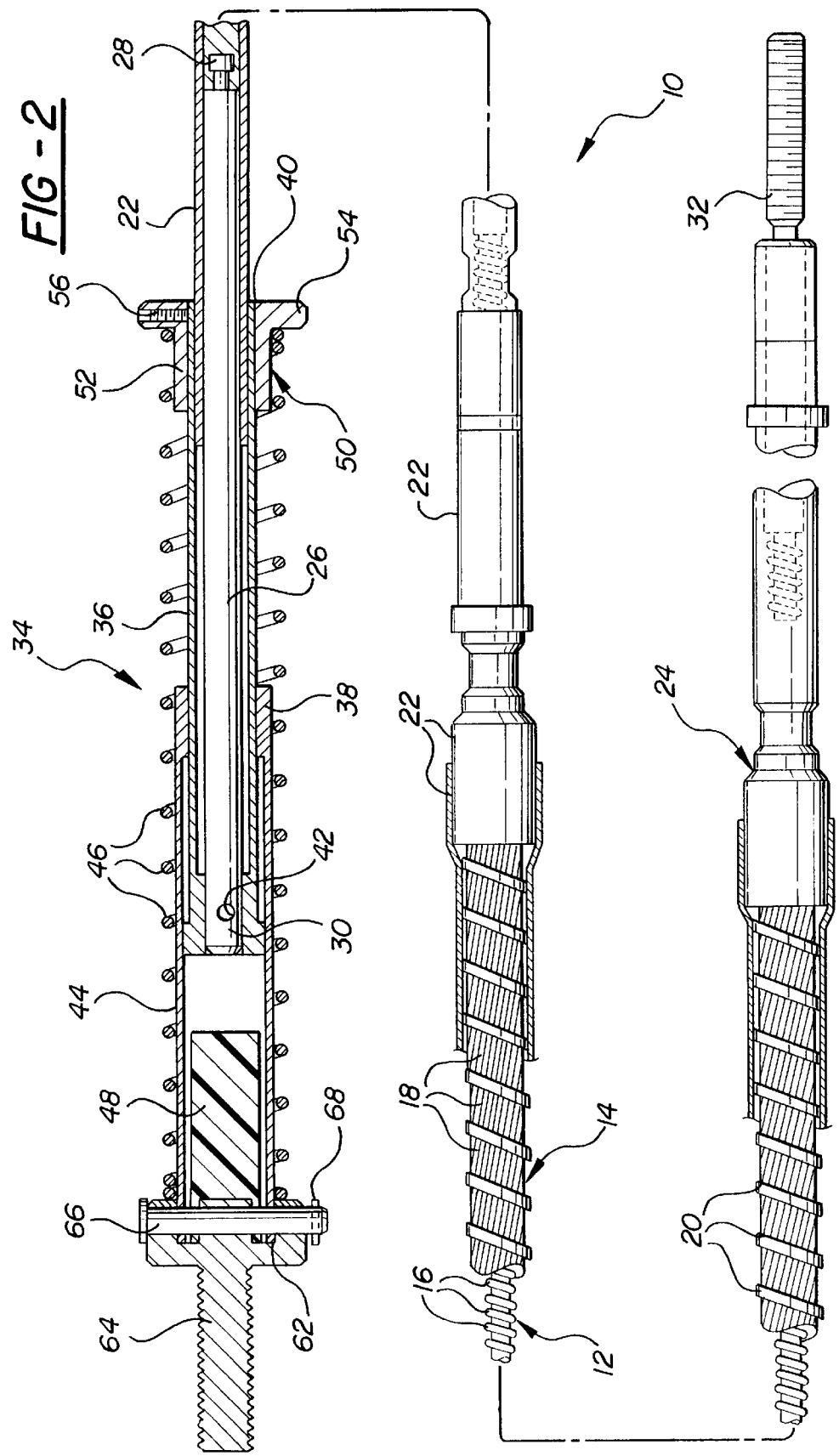
FIG. 2 is a view similar to FIG. 1 but showing the overtravel position.

Referring to the Figures, wherein like numerals indicate like or corresponding parts throughout the several views, a motion transmitting remote control assembly fabricated in accordance with the subject invention is generally shown at 10. As is well known in the art, the motion transmitting remote control assembly is of the type comprising a flexible motion transmitting core element, generally indicated at 12, slidably supported for longitudinal movement in a conduit, generally indicated at 14. The core element 12 comprises a plurality of wire strands wound together in a helical fashion with a wire filament 16 wound spirally about the wire strands to define axial spaced convolutions. The conduit 14 typically includes an inner tubular element, frequently extruded plastic, surrounded by a compliment of filaments 18 which are bound by a flat wire 20 wrapped in spaced convolutions about the filaments 18.

A tubular fitting 22 is connected to and extends from one end of the conduit 14. An equivalent fitting or ferrule 24 is attached to the other end of the conduit 14.

A first rod 26 is slidably disposed in the tubular fitting 22 and has coupling 28 at an inner end attached to the core element 12 and an outer end 30 extending form the tubular fitting 22. A second rod 32 is slidably attached to the other end of the core element 12 and is slidably disposed in the fitting 24. The second rod 32 is threaded for connection to a control member.

However, a terminal mechanism, generally shown at 34, is attached to the outer end 30 of the first rod 26 for transmitting motion between the rod 26 and a control member, not shown, and for providing lost motion between the rod 26 and the control member in response to a predetermined force acting between the rod 26 and the control member. The assembly 10 is characterized by the terminal mechanism 34 including an anchor member 36 slidably supported on the tubular fitting 22. The anchor member 36 is tubular and has a rod end 38 secured to the outer end 30 of the rod 26 and an anchor end 40 disposed in close sliding relationship about the tubular fitting 22. The rod end 38 of the anchor member 36 is secured to the outer end 30 of the rod 26 by a pin 42 interconnecting the rod 26 and the rod end 38 of the anchor member 36 to prevent relative longitudinal movement therebetween. The pin 42 extends diametrically through the rod 26 and the anchor member 36 and may threadedly engage either the rod 26 or the anchor member 36.

The terminal mechanism 34 includes a connector member 44 for connection to a control member and a coil spring 46. The connector member 44 is in telescoping relationship with the anchor member 36 and the spring 46 is spirally disposed between the anchor end 40 of the anchor member 36 and the connector member 44 for biasing the connector member 44 in an extending direction from the anchor member 36. A resilient cushion 48 is disposed in the connector member 44 for cushioning collapsing movement of the connector member 44 over the anchor member 36.

A radially extending flange element, generally indicated at 50, is disposed at the anchor end 40 of the anchor member 36 for abutting the spring 46. The flange element 50 includes a ring 52 extending annularly about the anchor member 36 and an annular disk 54 extending radially from the ring 52. The flange element 50 is an integral piece and separate from the anchor member 36 and includes a fastener 56 for removably securing the flange element 50 to the anchor member 36. The fastener 56 is a screw threadedly engaging the disk 54 to frictionally engage an axially extending groove in the outer surface of the anchor member 36, which prevents rotation of the flange element 50.

An abutment coacts between the connector member 44 and the anchor member 36 for limiting movement of the connector member 44 in the extending direction from the anchor member 36 and is defined by a female shoulder 58 extending radially inwardly on the connector member 44 and a male shoulder 60 extending radially outwardly on the anchor member 36 with the shoulders 58 and 60 being in radial overlapping relationship with one another.

The connector member 44 is tubular and extends between the abutment 58 and 60 at an inner end to an open distal end 62. A link 64 extends into the distal end 62 and a pin 66 extends diametrically through the distal end 62 and the link 64. The pin 66 is retained in place by a clip 68. The link 64 has center portion extending into the hollow of the connector member 44 and an annular cup disposed about the end of the connector member 44, with the pin 66 extending diametrically through both.

The invention also provides a method of fabricating a terminal mechanism 34 for attachment to the outer end 30 of a rod 26 secured to a core element 12 slidably supported in a conduit 14 having a tubular fitting 22 extending from one end of the conduit 14 in a motion transmitting assembly 10 for providing lost motion between the rod 26 and the control member in response to a predetermined force acting between the rod 26 and the control member. The method comprising the steps of sliding a rod end 38 of a tubular anchor member 36 into an open end of a tubular connector member 44, establishing an abutment coacting between the connector member 44 and the anchor member 36 for limiting movement of the connector member 44 to a fully extended position in relationship to the anchor member 36, biasing the connector member 44 to the fully extended position from the anchor member 36 with the predetermined force, sliding the anchor member 36 over the tubular fitting 22 extending from the conduit 14, and connecting the rod end 38 of the anchor member 36 to the outer end 30 of the rod 26. The biasing is further defined as placing a coil spring 46 about the anchor member 36 and the connector member 44. The method includes placing a flange element 50 on the anchor member 36 to react with the spring 46 and connecting a link 64 to the open end of the connector member 44 to react with the spring 46 to bias the connector member 44 to the fully extended position.

The method is further defined as first sliding the telescoping connector 44 and anchor 36 members over the tubular fitting 22 to expose the rod end 38 of the anchor member 36 for connecting the rod end 38 of the anchor member 36 to the outer end 30 of the rod 26. In addition, the flange element 50 is positioned, by sliding, onto the tubular fitting 22 along with the connector and anchor 36 members and is placed on the anchor member 36 after connecting the rod end 38 of the anchor member 36 to the outer end 30 of the rod 26. In other words, the connector member 44 is slid back onto the tubular fitting 22 to allow the pin 42 to be placed in position. After the flange element 50 is secured to the anchor end 40 of the anchor member 36, the coil spring 46 is placed about the connector and anchor 36 members. The link 64 is connected to the open end of the connector member 44 after placing the coil spring 46 about the connector and anchor 36 members. In cases where used, a resilient cushion 48 is placed in the connector member 44 before attaching the link 64 for cushioning collapsing movement of the connector member 44 over the anchor member 36.

In operation, the link 64 is attached to a member to be controlled, i.e., moved, and that control member is moved in response to input movement from the second rod 32 at the other and remote end of the assembly 10. This movement is transmitted through the spring 46 during normal operation. However, in the event the control member, to which the link 64 is attached, bottoms out or is otherwise prevented from moving, the spring 46 will collapse in response to a force of a predetermined magnitude. In other words, the spring 46 is quite strong enough to transmit normal forces between the rods 26 and 32 but will collapse or compress under a predetermined force acting between the rods 26 and 32.

It is also possible to fabricate the assembly so that the distance the connector member 44 can telescope onto the anchor member 36 is equal to the stroke to the core element 12, which, in turn, may be determined by the travel of the anchor member 36 on the tubular fitting 22.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly comprising:

a motion transmitting core element (12);

a conduit (14) supporting said core element (12) for longitudinal movement therein;

a tubular fitting (22) extending from one, end of said conduit (14);

a rod (26) slidably disposed in said tubular fitting (22) and having an inner end attached (28) to said core element (12) and an outer end (30) extending from said tubular fitting (22);

a terminal mechanism attached to said outer end (30) of said rod (26) for transmitting motion between said rod (26) and a control member and for providing lost motion between said rod (26) and the control member in response to a predetermined force acting between said rod (26) and the control member;

said assembly characterized by said terminal mechanism including a tubular anchor member (36) slidably supported on said tubular fitting (22) having a rod end (38) secured said outer end (30) of said rod (26) and an anchor end 40 disposed in close sliding relationship about said tubular fitting (22), a connector member (44) for connection to the control member, said connector member (44) being in telescoping relationship with said inner anchor member (36), said terminal mechanism further including a spring (46) disposed between said anchor end (40) of said anchor member (36) said connector member (44) for biasing said connector member (44) in an extending direction from said anchor member (36).

2. An assembly as set forth in claim 1 including a resilient cushion (48) disposed in said connector member (44) for cushioning collapsing movement of said contour member (44) over said anchor member (36).

3. An assembly as set forth in claim 1 including a radially extending flange element (50) at said anchor end (40) of said anchor member (36) for abutting said spring (46).

4. An assembly as set forth in claim 3 wherein said flange element (50) includes a ring (52) extending annularly about said anchor member (36) and an annular disk (54) extending radially from said ring (52).

5. An assembly as set forth in claim 3 wherein said flange element (50) is separate from said anchor member (36) and includes a fastener for removably securing said flange element (50) to said anchor member (36).

6. An assembly as set forth in claim 3 including an abutment coacting between said connector member (44) and said anchor member (36) for limiting movement of said connector member (44) in said extending direction from said anchor member (36).

7. An assembly as set forth in claim 6, wherein said connector member (44) is tubular and extends between said abutment at an inner end to an open distal and (62), a link (64) extending into said distal end (62) and a pin (66) extending diametrically through said distal end (62) and said link (64).

8. An assembly as set forth in claim 6 wherein said abutment is defined by a female shoulder (58) extending radially inwardly on said connector member (44) and a male shoulder (60) extending radially outwardly on said anchor member (36) with said shoulders being in radial overlapping relationship with one another.

9. An assembly as set forth in claim 8 including a pin (42) interconnecting said rod (26) and said rod end (38) of said anchor member (36) to prevent relative longitudinal movement therebetween.

* * * * *